United States Patent [19]

Chomes

[11] 4,103,061

[45] Jul. 25, 1978

[54] PROTECTIVE MEMBRANE FLASHING

[76] Inventor: Harry Chomes, 29 Jameson Rd., Newton, Mass. 02158

[21] Appl. No.: 619,588

[22] Filed: Oct. 6, 1975

Related U.S. Application Data

[63] Continuation of Ser. No. 440,650, Feb. 8, 1974, abandoned.

[51] Int. Cl.² ............................................. B32B 7/12
[52] U.S. Cl. ................................. 428/247; 428/251; 428/430; 428/480
[58] Field of Search ............... 428/109, 210, 138, 140, 428/228, 247, 255, 430, 251, 480, 268, 285; 156/309, 291, 178, 179

[56] References Cited

U.S. PATENT DOCUMENTS

| | | | |
|---|---|---|---|
| 2,650,184 | 8/1953 | Brefeld | 156/284 |
| 2,961,365 | 11/1960 | Sroog | 428/285 |
| 3,058,863 | 10/1962 | Gaines et al. | 428/282 |
| 3,282,722 | 11/1966 | Hailstone | 428/430 |
| 3,369,774 | 2/1968 | Struble | 428/268 |
| 3,444,025 | 5/1969 | Hillas | 156/178 |
| 3,687,764 | 8/1972 | Rogosch et al. | 156/179 |

*Primary Examiner*—James J. Bell
*Attorney, Agent, or Firm*—Joseph Zallen

[57] ABSTRACT

A flashing characterized as being highly resistant to flexure, cutting, punctures and low temperatures, a non-metallic laminate made of thin polyester film held between fibrous glass mesh sheets with a resinous adhesive.

4 Claims, No Drawings

PROTECTIVE MEMBRANE FLASHING

This application is a continuation of my co-pending patent application of the same title, Ser. No. 440,650, filed Feb. 8, 1974, now abandoned.

BACKGROUND OF INVENTION

This invention relates to flashing. In particular it relates to membrane flashing which is flashing used against the surfaces of materials such as structural steel beams, steel lintels, or other structural steel elements buried in masonry that need protection from penetrating moisture which can cause corrosion. A common form of protective membrane flashing is "through-wall" flashing which is flashing positioned in the masonry so as to guide moisture back to the exterior surface and thus prevent penetration into the interior of the masonry wall.

Protective membrane flashing or through-wall flashing that have been hitherto described have been generally of three types. One has been an asphaltic type wherein asphalt is coated on both sides of a flexible support such as paper or the like. Another type of material used for through-wall flashing has been corrosion-resistant metal, as for example, copper or stainless steel. A third type is plastic flashing. Each of these flashing materials has certain disadvantages.

Metallic flashing is expensive and typically requires precise preforming by the use of a brake or the like which is difficult where there is much wall unevenness. Also, metallic flashing has a relatively low flexure resistance. Plastic flashing typically has a very low resistance to cutting or puncturing, while asphaltic flashing is notorious for its poor resistance to flexure and unsatisfactory resistance to low temperatures.

The present invention incorporates for the first time all of the desired characteristics and performance for protective membrane flashing. The products of this invention combine the qualities of low cost, high flexure resistance, high cut resistance, high resistance to low temperatures, light weight and compactness with free form flexibility. The products of this invention do not require any preforming when used as flashing, but may be draped by the mason so as to follow the contours and unevennesses in masonry construction. This contrasts with typical construction procedures where the contractor is responsible for the flashing material and must preform the material into the appropriate shape on a brake or similar device and then deliver it in preformed shape to the mason who applies it to the particular lintel, spandrel, sill, coping or the like.

Other objects and advantages of this invention will be apparent from the description and claims which follow.

SUMMARY OF INVENTION

The invention comprises generally a water-resistant sheet characterized as having substantial resistance to both flexure and cutting and being further characterized as being sufficiently flexible and free forming so as to drape into desired flashing form in a building structure without the necessity of preforming. The sheet comprises a thin laminate made of a middle layer of polyester film and outer layers of fibrous glass mesh sheets held together with a resinous adhesive.

A commercial form of polyester film which can be used in the present invention is Mylar, a polyester terephthalate product of E. I. Du Pont deNemours and Co., as for example Type A, which is described in Du Pont's bulletin M-2D as having an ultimate tensile strength of 25,000 pounds per square inch in a film of 0.001 inches in thickness. A commercial example of a fibrous glass mesh which can be used in this invention is a woven fabric by Burlington Glass Fabrics Company, whose style 1658 has a thickness of 0.004 inches, weighs 1.60 ounces per square yard, and is a 20 by 10 construction, that is to say, 20 ends in the warp of the material and 10 picks in the filling of the material or 200 mesh openings per square inch. The tensile strength of the warp is about 80 pounds per square inch and of the fill about 70 pounds per square inch.

The resinous adhesive that may be used in this invention is any of a large number of commercial formulations which will bond to both the polyester film and the fibrous glass mesh and is of sufficient thickness as to provide sufficient adhesion to permit flexing but not to penetrate to the outer surface of the fibrous glass mesh. It is preferred that the resinous adhesive layer be thin enough so that it adheres substantially onto the back portions of the glass fibers and does not penetrate substantially into the mesh openings, thus providing fibrous glass mesh which is adhered to the polyester film, but its mesh opening volumes substantially unfilled and which has its outer fibrous glass surface uncoated by the adhesive.

Products of this invention when formed into flashing strips can be sealed onto one another in the common lap arrangement by means of adhesive, in contrast to metallic flashing which requires soldering.

In addition to the products of this invention as flashing materials, the sheet of this invention can also be used to provide a covering or envelope to surround a building structure in cold weather where mortar or cement must be kept at a relatively high temperature for proper curing.

SPECIFIC EXAMPLE OF INVENTION

A specific example of this invention was prepared by laminating each surface of Mylar a polyester film of 0.003 inches in thickness with a mesh sheet of fibrous glass, each mesh sheet being 20 by 10 construction (20 ends in the warp and 10 picks in the filling) with a tolerance of plus or minus 2 ends or picks. The yarn in the warp was ECG 150 1/0 yarn and in the filling ECG 75 1/0 yarn. The thickness before the resinous adhesive was applied was about 0.004 inches and it weighed about 1.60 ounces per square yard. Lamination was accomplished by a vacuum lamination process in which the samples were placed under a silicone blanket and the inside air evacuated. The adhesive was activated by heat from heating elements moved over the blanket. The resultant laminate had a thickness of about 0.011 inches.

The product of the invention was found to have a tensile strength of between 10,000 and 11,000 pounds per square inch and a moisture vapor transmission of about 10 grams per square meter during a 24 hour period, in accordance with ASTM E96 procedure B. The product had an Elmendorf tear value in the order of 100 and survived 86,000 flex cycles with very slight or no cracking at room temperature. With 20,000 flex cycles at a temperature of −20° F there was no cracking. Corrosion resistance against freshly prepared concrete showed slight discoloration and no deleterious effect after 14 days wherein the strips of the product were placed between the freshly prepared concrete and already exsisting concrete slabs. This example of the invention also showed excellent resistance to solutions of calcium chloride and sodium carbonate, which are common alkaline constituents of mortar and concrete.

The products of this invention were found to be easily worked with no special tools into the desired flashing for protective membrane flashing such as through-wall flashing. No soldering was required and the flashing easily fitted and draped to the required profile of the various members of the building such as spandrels, columns and lintels. The product was free of bleeding, running or staining and showed no holes either at the beginning or after long exposure to alkali in mortar or concrete. No noticeable change was observed after a considerable period of time and the material retained its physical integrity with no disintegration, drying, shrinking or staining. The material has the shear strength required for resistance to wall motions in buildings.

I claim:

1. A protective membrane flashing for a building structure, formed by shaping a water-resistant sheet characterized as having substantial resistance to flexure, cutting and low temperature and being further characterized as being sufficiently flexible and free-forming so as to drape into desired form; said sheet comprising a thin polyester film held between fibrous glass mesh sheets with a resinous adhesive layer, said resinous adhesive layer adhering substantially to the back portions but not penetrating substantially into the mesh openings, whereby the mesh opening volumes are substantially unfilled and the outer surface of the mesh is uncoated by the adhesive.

2. The flashing of claim 1 wherein the laminate is characterized as having a thickness of about 10 to 13 thousandths of an inch and a polyester film thickness of about 1 to 4 thousandths of an inch.

3. The flashing of claim 1 wherein the polyester film is made from polyethylene terephthalate.

4. The flashing of claim 1 wherein the polyester film is made from polyethylene terephthalate and has a thickness of about 1 to 4 thousandths of an inch and the laminate is characterized as having a thickness of about 10 to 13 thousandths of an inch.

* * * * *